United States Patent
He

(10) Patent No.: US 12,241,778 B2
(45) Date of Patent: Mar. 4, 2025

(54) METHOD FOR DETECTING LIGHT LEAKAGE OF SCREEN, METHOD FOR DETECTING AMBIENT LIGHT, AND APPARATUS FOR DETECTING AMBIENT LIGHT

(71) Applicant: SHENZHEN GOODIX TECHNOLOGY CO., LTD., Shenzhen (CN)

(72) Inventor: Chao He, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 126 days.

(21) Appl. No.: 18/064,333

(22) Filed: Dec. 12, 2022

(65) Prior Publication Data
US 2023/0358603 A1 Nov. 9, 2023

(30) Foreign Application Priority Data
May 9, 2022 (CN) .......................... 202210498676.2

(51) Int. Cl.
*G01J 1/42* (2006.01)
(52) U.S. Cl.
CPC .................... *G01J 1/4204* (2013.01)
(58) Field of Classification Search
CPC . G01J 1/4204; G01M 11/02; G09G 2360/144
See application file for complete search history.

(56) References Cited

U.S. PATENT DOCUMENTS

| 11,216,932 B1* | 1/2022 | Checka | G06T 7/0002 |
| 2021/0185167 A1* | 6/2021 | Chen | G09G 3/3225 |
| 2021/0398313 A1* | 12/2021 | Lemley | G06V 40/176 |

FOREIGN PATENT DOCUMENTS

| CN | 108716950 A | 10/2018 |
| CN | 111638756 A | 9/2020 |
| CN | 112082644 A | 12/2020 |
| CN | 112465135 A | 3/2021 |
| CN | 112484967 A | 3/2021 |
| CN | 112599089 A | 4/2021 |
| CN | 122985588 A | 6/2021 |
| CN | 113188656 A | 7/2021 |

(Continued)

*Primary Examiner* — Tarifur R Chowdhury
*Assistant Examiner* — Carlos Perez-Guzman
(74) *Attorney, Agent, or Firm* — Emerson, Thomson & Bennett, LLC; Roger D. Emerson; Matt J. Wilson

(57) ABSTRACT

The present disclosure provides a method for detecting light leakage of a screen, a method for detecting ambient light, and an apparatus for detecting ambient light. The method for detecting light leakage of a screen includes: acquiring display parameters of a screen, the display parameters including: a brightness value of the screen and grayscale values of respective pixel points within a preset display region of the screen; inputting the display parameters into a pre-trained neural network model, to process the display parameters using the neural network model, to obtain light leakage values corresponding to the respective pixel points; and obtaining a light leakage value of the screen based on the light leakage values corresponding to the respective pixel points. Based on the above technical solutions, the light leakage value of the screen can be accurately and reliably determined.

13 Claims, 7 Drawing Sheets

(56) References Cited

FOREIGN PATENT DOCUMENTS

| | | |
|---|---|---|
| CN | 113241079 A | 8/2021 |
| CN | 113409199 A | 9/2021 |
| CN | 113628533 A | 11/2021 |
| CN | 113768514 A | 12/2021 |
| CN | 113887599 A | 1/2022 |
| CN | 114120868 A | 3/2022 |
| CN | 114206223 A | 3/2022 |

\* cited by examiner

METHOD FOR DETECTING LIGHT LEAKAGE OF SCREEN, METHOD FOR DETECTING AMBIENT LIGHT, AND APPARATUS FOR DETECTING AMBIENT LIGHT

CROSS REFERENCE TO RELATED APPLICATIONS

The present application claims the benefit of priority under the Paris Convention to Chinese Patent Application No. 202210498676.2 filed on May 9, 2022, and entitled "METHOD FOR DETECTING LIGHT LEAKAGE OF SCREEN, METHOD FOR DETECTING AMBIENT LIGHT, APPARATUS FOR DETECTING LIGHT LEAKAGE OF SCREEN, APPARATUS FOR DETECTING AMBIENT LIGHT, AND ELECTRONIC DEVICE", which is incorporated herein by reference in its entirety.

TECHNICAL FIELD

Embodiments of the present disclosure relate to the technical field of terminal detection, and in particular to, a method for detecting light leakage of a screen, a method for detecting ambient light, an apparatus for detecting light leakage of a screen, an apparatus for detecting ambient light, an electronic device, and a computer storage medium.

BACKGROUND

In order to meet the trend of large screens of electronic devices, e.g., a mobile phone, components, e.g., an ambient light sensor (ALS), will be built in below a screen of an electronic device. The ALS is configured to detect an ambient light intensity. The electronic device may adjust brightness of a screen based on the ambient light intensity detected by the ALS, such that the brightness of the screen conforms to visual perception of human eyes. In addition, the electronic device may further adjust color temperatures based on the ambient light intensity detected by the ALS, to assist in display and photographing.

However, since the ALS is provided below the screen, when detecting ambient light, the ALS is vulnerable to the interference of light leakage below the screen caused by light emitted by the screen itself. A real ambient light intensity can be obtained by subtracting a leakage light intensity from the ambient light intensity detected by the ALS.

Therefore, there is an urgent need for a technology that can accurately detect light leakage of a screen.

SUMMARY

In view of this, embodiments of the present disclosure provide a method for detecting light leakage of a screen, a method for detecting ambient light, an apparatus for detecting light leakage of a screen, an apparatus for detecting ambient light, an electronic device, and a computer storage medium, to at least partially solve the above problems.

According to a first aspect of the embodiments of the present disclosure, a method for detecting light leakage of a screen is provided, including: acquiring display parameters of a screen, the display parameters comprising: a brightness value of the screen and grayscale values of respective pixel points within a preset display region of the screen;
inputting the display parameters into a pre-trained neural network model, to process the display parameters using the neural network model, to obtain light leakage values corresponding to the respective pixel points; and
obtaining a light leakage value of the screen based on the light leakage values corresponding to the respective pixel points.

In an alternative embodiment, the neural network model includes a plurality of light leakage detection sub-models, where each of the light leakage detection sub-models corresponds to a target brightness interval; and
the inputting the display parameters into the pre-trained neural network model, to process the display parameters using the neural network model, to obtain the light leakage values corresponding to the respective pixel points, includes:
determining a target brightness interval in which the brightness value is located; and
inputting the display parameters into a light leakage detection sub-model corresponding to the target brightness interval, to process the display parameters using the light leakage detection sub-model, to obtain the light leakage values corresponding to the respective pixel points.

In an alternative embodiment, the neural network model includes a residual module, the residual module includes a plurality of fully connected units, the plurality of fully connected units is sequentially connected in series, a skip connection exists between the plurality of fully connected units, and the skip connection includes a connection between two non-adjacent fully connected units.

In an alternative embodiment, the skip connection is a skip connection between a first fully connected unit and a last fully connected unit among the plurality of fully connected units.

In an alternative embodiment, the number of the residual modules is plural, the neural network model further includes a first fully connected module and a second fully connected module, and the plurality of residual modules is cascade-connected and is located between the first fully connected module and the second fully connected module.

In an alternative embodiment, each of the fully connected units includes a fully connected layer, batch normalization, and an activation function.

In an alternative embodiment, a training process of the neural network model includes:
establishing an initial neural network model;
acquiring sample display parameters and a sample light leakage value of the screen;
inputting the sample display parameters into the initial neural network model to obtain a predicted light leakage value;
obtaining a loss value of the initial neural network model based on the predicted light leakage value and the sample light leakage value; and
training the initial neural network model based on the loss value, to obtain the neural network model.

In an alternative embodiment, the neural network model includes a plurality of output channels, the predicted light leakage value includes a plurality of predicted channel light leakage values, one of the predicted channel light leakage values corresponds to one of the output channels, the sample light leakage value includes a plurality of sample channel light leakage values, and one of the sample channel light leakage values corresponds to one of the output channels; and
the obtaining the loss value of the initial neural network model based on the predicted light leakage value and the sample light leakage value includes:

obtaining, for each of the output channels, a loss value corresponding to the output channel based on a predicted channel light leakage value and a sample channel light leakage value corresponding to the output channel; and fusing the loss values corresponding to the plurality of output channels to obtain the loss value of the initial neural network model.

In an alternative embodiment, the detection method further includes: performing integer quantization on the neural network model, and storing the quantized neural network model.

In an alternative embodiment, the preset display region is a light detection region of the screen, and the light detection region corresponds to a position of a light sensor provided below the screen.

In an alternative embodiment, the obtaining the light leakage value of the screen based on the light leakage values corresponding to the respective pixel points includes:

acquiring light leakage weight values of the pixel points, where the light leakage weight value of each of the pixel points is associated with a relative position between the pixel point and the light sensor provided below the screen; and determining the light leakage value of the screen based on the light leakage values corresponding to the respective pixel points and the light leakage weight values of the respective pixel points.

According to a second aspect of the embodiments of the present disclosure, a method for detecting ambient light is provided, including:

determining a light leakage value of a screen based on the method for detecting ambient light according to the first aspect;

acquiring a light sensitivity value detected by a light sensor provided below the screen; and determining a real ambient light value based on the light sensitivity value and the light leakage value.

According to a third aspect of the embodiments of the present disclosure, an apparatus for detecting light leakage of a screen is provided, including:

an acquiring module configured to acquire display parameters of a screen, the display parameters including: a brightness value of the screen and grayscale values of pixel points within a preset display region of the screen;

a processing module configured to input the display parameters into a pre-trained neural network model, to process the display parameters using the neural network model, to obtain light leakage values corresponding to the respective pixel points; and a determining module configured to obtain a light leakage value of the screen based on the light leakage values corresponding to the respective pixel points.

According to a fourth aspect of the embodiments of the present disclosure, an apparatus for detecting ambient light is provided, including:

a screen light leakage detecting apparatus configured to determine a light leakage value of a screen, where the screen light leakage detecting apparatus is the apparatus for detecting light leakage of a screen according to the third aspect;

an acquiring module configured to acquire a light sensitivity value detected by a light sensor provided below the screen; and an ambient light computing module configured to determine a real ambient light value based on the light sensitivity value and the light leakage value.

According to a fifth aspect of the embodiments of the present disclosure, an electronic device is provided, including: at least one processor, a memory, a bus, and a communication interface, where the processor stores a program, the processor, the communication interface, and the memory complete communication with each other through the communication bus, the communication interface is configured to communicate with other devices or components, and the processor executes the program.

According to a sixth aspect of the embodiments of the present disclosure, a computer storage medium is provided, storing a computer program thereon, where the computer program, when executed by a processor, implements the method for detecting light leakage of a screen according to the first aspect, or the method for detecting ambient light according to the second aspect.

Based on the above solutions, because the neural network model has high self-learning and adaptive ability, the trained neural network model learns internal correlation between display parameters, such as grayscale values and brightness values of pixel points in the screen, and light leakage values of the pixel points. Therefore, when the light leakage value of the screen is determined, the display parameters of the screen are acquired, and are inputted into the neural network model, such that the light leakage values of the pixel points in the screen can be accurately and reliably determined, and then, the light leakage value of the screen can be accurately and reliably determined by fusing the light leakage values of each of the pixel points.

BRIEF DESCRIPTION OF THE DRAWINGS

To more clearly describe the technical solutions in embodiments of the present disclosure or the prior art, the accompany drawings to be used in the description of the embodiments or the prior art will be briefly introduced below. Apparently, the drawings in the description below are merely some embodiments disclosed in the embodiments of the present disclosure. For those of ordinary skills in the art, other drawings may also be obtained based on these drawings.

DETAILED DESCRIPTION OF EMBODIMENTS

To enable those skilled in the art to better understand the technical solutions in embodiments of the present disclosure, the technical solutions in the embodiments of the present disclosure will be clearly and completely described below with reference to the accompanying drawings in the embodiments of the present disclosure. Apparently, the described embodiments are merely a part, instead of all, of the embodiments of the present disclosure. All other embodiments obtained by those of ordinary skills in the art based on some embodiments among the embodiments of the present disclosure shall be encompassed within the scope of protection of the embodiments of the present disclosure.

Figure 1:
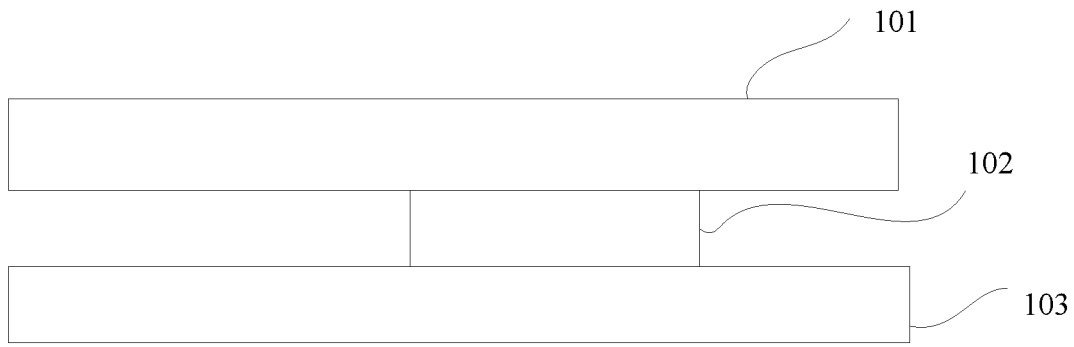
FIG. 1 is a schematic structural diagram of an electronic device provided in an embodiment of the present disclosure.

The method for detecting light leakage of a screen provided in the embodiments of the present disclosure is adapted to an electronic device with a light sensor provided below a screen thereof. Referring to FIG. 1, in order to meet the trend of large screens of electronic devices, e.g., a mobile phone, and in order to maintain the integration of simple appearance and industrial design, a light sensor 102 is installed below a screen 101 of an electronic device, and more specifically, installed below a light detection region on the screen 101 for detecting an ambient light intensity. In an implementation, the light sensor 102 may output a light sensitivity value of five sensing channels (RGBCW). The ambient light intensity may be obtained by converting the light sensitivity value (also referred to as a DN value) of the five sensing channels through a specific algorithm.

A main board of the electronic device is provided with a processor, which may adjust brightness of the screen 101 based on the ambient light intensity detected by the light sensor 102, such that the brightness of the screen 101 conforms to visual perception of human eyes. The processor may further adjust color temperatures based on the ambient light intensity detected by the light sensor 102, to assist in display and photographing.

However, as a commonly used screen for electronic devices, a liquid crystal display screen and an organic light-emitting diode (OLED) have light leakage of the screen. The light leakage of the screen means that light emitted by the screen itself will be emitted from the back of the screen 101. The back of the screen 101 is opposite to the front of the screen 101. The front of the screen 101 refers to a side that is directly observable. Since the light sensor 102 is provided below the screen 101, the light sensor 102 is vulnerable to the interference of the light leakage of the screen when detecting ambient light. That is, the light intensity detected by the light sensor 102 includes not only the real ambient light intensity, but also the light intensity of the leakage light of the screen, such that the real ambient light intensity can be obtained only by subtracting the light intensity of the leakage light of the screen from the light intensity detected by the light sensor 102.

Therefore, the key for the light sensor 102 to correctly detect the ambient light intensity is how to accurately compute the light intensity of the leakage light of the screen. The light leakage of the screen is associated with many factors. The inventor sought factors associated with the light leakage of the screen by analysis on a large amount of experimental data, and finally found that the light leakage of the screen is associated with a plurality of screen display parameters, such as grayscale values of pixel points in the screen 101, a brightness value of the screen 101, a refresh rate of the screen 101, and a display mode of the screen 101, and there is a stable relationship between the light leakage of the screen and these screen display parameters. In related technologies, it is mentioned that binary linear fitting is used to fit the relationship between these screen display parameters and the light leakage of the screen. However, the relationship between the screen display parameters and the light leakage of the screen is not a simple linear relationship. In addition, different screens are used for different electronic devices, thereby resulting in a great difference between linearities of different electronic devices. Therefore, the linear fitting will lead to a large error in the finally obtained light leakage of the screen, and thus can hardly meet the user needs.

Based on the above problems, the embodiment of the present disclosure provides a method for detecting light leakage of a screen, for which a pre-trained neural network model is used. Based on high self-learning and adaptive ability of the neural network model, the trained neural network model learns internal correlation between display parameters, such as grayscale values and brightness values of pixel points in the screen, and light leakage values of the pixel points. Therefore, when the light leakage value of the screen is determined, the display parameters of the screen are acquired, and are inputted into the neural network model, such that the light leakage values of the pixel points in the screen can be accurately and reliably determined, and then, the light leakage value of the screen can be accurately and reliably determined by fusing the light leakage values of each of the pixel point.

Specific implementations of the embodiments of the present disclosure will be further described below with reference to the drawings in the embodiments of the present disclosure.

Figure 2:
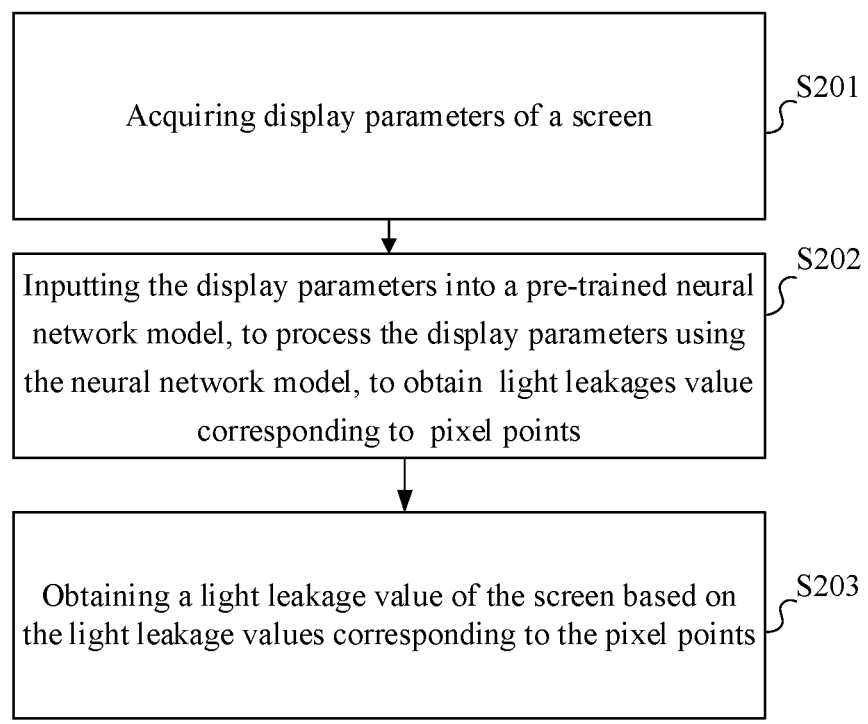
FIG. 2 is a schematic flowchart of a method for detecting light leakage of a screen provided in an embodiment of the present disclosure.

FIG. 2 is a schematic flowchart of a method for detecting light leakage of a screen provided in an embodiment of the present disclosure. The method may be executed by the electronic device shown in FIG. 1. The leakage light of the screen refers to light that is emitted by the screen itself, and is emitted from the back of the screen. As shown in FIG. 2, the method includes:

Step S201: acquiring display parameters of a screen.

The display parameters may include: a brightness value of the screen and grayscale values of pixel points within a preset display region of the screen.

The brightness value of the screen refers to a brightness value of a content displayed on the screen.

In a specific implementation, the electronic device may read the brightness value of the screen from an operating system of the electronic device through a corresponding interface.

The grayscale values of the respective pixel points within the preset display region of the screen refer to grayscale values of respective pixel points of a content displayed within the preset display region. When the displayed content is a multi-channel image, the grayscale value of each pixel point may include a grayscale value of various color component of each pixel point. When the displayed content is, e.g., a RGB image, the grayscale value of each pixel point may include a grayscale value of a red channel R, a grayscale value of a green channel G, and a grayscale value of a blue channel B of each pixel point.

In a specific implementation, the electronic device may capture the display content within the preset display region on the screen using screenshot software, to obtain the grayscale values of the respective pixel points within the preset display region.

In the present embodiment, selection of the preset display region is associated with a position of a light sensor provided below the screen. Generally, the center of the light sensor receives a strongest light signal, and makes greatest contribution to the light leakage of the screen. The farther the preset display region deviates from the center of the light sensor, the weaker the light signal received by the light sensor is, and the less the preset display region makes contribution to the light leakage of the screen.

Using this feature, in an implementation, the preset display region is a light detection region of the screen. The light detection region is a screen region above the light sensor. The light detection region corresponds to the position of the light sensor provided below the screen. It is understandable that the light detection region of the screen is selected for use as the preset display region, thereby determining a light leakage value of the screen by making full use of grayscale values of pixel points within a region on the screen making great contribution to the light leakage, and then more accurately determining the light leakage value of the screen whilst reducing the computing workload in the subsequent process.

It should be understood that, in the present embodiment, the preset display region may also be other regions on the screen including at least a part of the light detection region above the light sensor. This is not limited in the embodiments of the present disclosure.

It should be noted that, in an implementation of the present disclosure, the display parameters not only include the brightness value of the screen and the grayscale values of the pixel points within the preset display region of the screen, but also may include a refresh rate of the screen, a display mode of the screen, and/or other parameters associated with light leakage of the screen. In a specific implementation, the electronic device may acquire corresponding display parameters of the screen from an operating system of the electronic device through a corresponding interface.

Step S202: inputting the display parameters into a pre-trained neural network model, to process the display parameters using the neural network model, to obtain light leakage values corresponding to the pixel points.

The light leakage values corresponding to the pixel points are used for indicating a light intensity of leakage light of a region in which the pixel points are located when the screen is in a current display state. The current display state may be understood as a display state of the screen in use.

The light leakage values corresponding to the pixel points may include light leakage values of a plurality of channels corresponding to the pixel points. For example, in an implementation, the light leakage values corresponding to the pixel points may include light leakage values of the red channel R corresponding to the pixel points, light leakage values of the green channel G corresponding to the pixel points, and light leakage values of the blue channel B corresponding to the pixel points. In another implementation, the light leakage values corresponding to the pixel points not only include the light leakage values of the red channel R, the light leakage values of the green channel G, and the light leakage values of the blue channel B, but also may include light leakage values of a Clear channel (hereinafter referred to as channel C) and light leakage values of a Wideband channel (hereinafter referred to as channel W), i.e., the light leakage values corresponding to the pixel points include the light leakage values of the five channels. The light leakage value of the channel C includes the light leakage values of three channels RGB, and the light leakage value of the channel W includes the light leakage values of four channels RGB and Infrared Radiation (IR).

In the present embodiment, the brightness value of the screen may be acquired through a system interface of the electronic device, and each pixel point within the preset display region may be traversed. For each pixel point, the grayscale value of the pixel point and the acquired brightness value of the screen are inputted as a group of to-be-processed data into the neural network model, to process the group of to-be-processed data using the neural network model, and predict the light leakage value corresponding to the pixel point. In this way, the light leakage values of the pixel points within the preset display region are obtained.

In the present embodiment, a deep neural network (DNN) model may be used as the neural network model. Inputted as the to-be-processed data into the neural network model, the grayscale values and the brightness value corresponding to the pixel points have no local features, and lower-layer neurons of the DNN model are connected with all upper-layer neurons. Therefore, the DNN model may be used for favorably extracting a feature association between all features of such type of to-be-processed data.

However, with the deepening of the model layers, the DNN model may be unable to be trained due to the occurrence of a phenomenon of gradient disappearance. Considering the balance between power consumption and performance when integrating the neural network model in the electronic device, and in order to improve the fitting accuracy of the neural network model, in another implementation of the present disclosure, a residual block structure based on a fully connected unit is used as the neural network model, and is abbreviated as a ResDNN model. The ResDNN model uses a skip connection between non-adjacent fully connected units, which enables adaptive skipping of some levels in the model during training, adaptive adjustment of learning depth, and avoidance of difficult training situations, such as gradient disappearance caused by large depth, so as to deepen the model level, and make the trained model have better fitting ability. The following detailed description of the ResDNN model may be referred to for a specific structure of the ResDNN model. The description will not be repeated here.

Step S203: obtaining a light leakage value of the screen based on the light leakage values corresponding to the respective pixel points.

The light leakage value of the screen is used for indicating a light intensity of leakage light of the screen when the screen is in a current display state.

For example, the light leakage values corresponding to the pixel points may be summed, and the summation result may be used as the light leakage value of the screen. When each light leakage value includes light leakage values of the plurality of channels, in an implementation, the light leakage values of each channel of the pixel points may be summed respectively, and the summation result may be used as the light leakage value of the screen; and in another implementation, light leakage values of a certain channel (for example, the green channel G) of the pixel points may be summed, and the summation result may be used as the light leakage value of the screen. This is not limited in the present embodiment.

Considering that distances between the pixel points in the preset display region on the screen and the center of the light sensor provided below the screen are different, light leakage of the pixel points makes different contribution to the light leakage of the screen. Specifically, the closer the pixel point is to the center of the light sensor, the greater the pixel point makes contribution to the light leakage of the screen. Otherwise, the farther the pixel point is from the center of the light sensor, the less the pixel point makes contribution to the light leakage of the screen. When the light leakage value of the screen is computed, the light leakage weight values of the pixel points are considered to improve the accuracy of light leakage detection of the screen.

Therefore, in an implementation of the present disclosure, step S203 includes: acquiring light leakage weight values of pixel points, where the light leakage weight value of each of the pixel points is associated with a relative position between the pixel point and the light sensor provided below the screen; and determining the light leakage value of the screen based on the light leakage values corresponding to the pixel points and the light leakage weight values of the pixel points.

Specifically, as mentioned above, the closer the pixel points are to the center of the light sensor, the greater the pixel points make contribution to the light leakage of the screen. Otherwise, the farther the pixel points are from the center of the light sensor, the less the pixel points make contribution to the light leakage of the screen.

Based on this feature, in an implementation, a proportion of leakage light of each pixel point in total leakage light of the screen may be pre-determined; and the proportion of the leakage light of each pixel point in the total leakage light of the screen may be determined for use as the light leakage weight value of the pixel point, and stored. In a practical application, the light leakage value of the screen may be determined by weighted summation based on the light leakage values corresponding to the pixel points and the light leakage weight values of the pixel points.

In another implementation, pixels of the screen may be pre-divided into blocks of a preset size based on positions thereof, and light leakage weight values of the blocks may be determined based on a proportion of leakage light of each block in the total leakage light of the screen, and stored. In a practical application, based on a light leakage weight value of a block to which each pixel point belongs and the number of pixel points included in the block, a light leakage weight value of the pixel point may be determined. For example, when a light leakage weight value of a block to which a pixel point belongs is Wi, and the number of pixel points included in the block is N, the light leakage weight value of the pixel point is Wi/N. The light leakage value of the screen is determined by weighted summation based on the light leakage values corresponding to the pixel points and the light leakage weight values of the pixel points. In the present implementation, since a light leakage weight value of a storage block is not the light leakage weight value of each pixel point, a storage space required for storing the light leakage weight value is reduced.

Based on the above solutions, because the neural network model has high self-learning and adaptive ability, the trained neural network model learns internal correlation between display parameters, such as grayscale values and brightness values of pixel points in the screen, and light leakage values of the pixel points. Therefore, when the light leakage value of the screen is determined, these display parameters of the screen are acquired, and are inputted into the neural network model, such that the light leakage values of the pixel points can be accurately and reliably determined, and then, the light leakage value of the screen can be accurately and reliably determined based on the light leakage values of the pixel points.

Further, the ResDNN model uses a skip connection between fully connected units, which enables adaptive skipping of some levels in the model during training, and adaptive adjustment of learning depth, such that the trained ResDNN model shows stronger fitting ability, faster training, and higher convergence accuracy. When the ResDNN model is used as the neural network model, the light leakage value of the screen can be more accurately and reliably determined. The ResDNN model is described in detail below with reference to FIG. 3 and FIG. 4.

Figure 3:
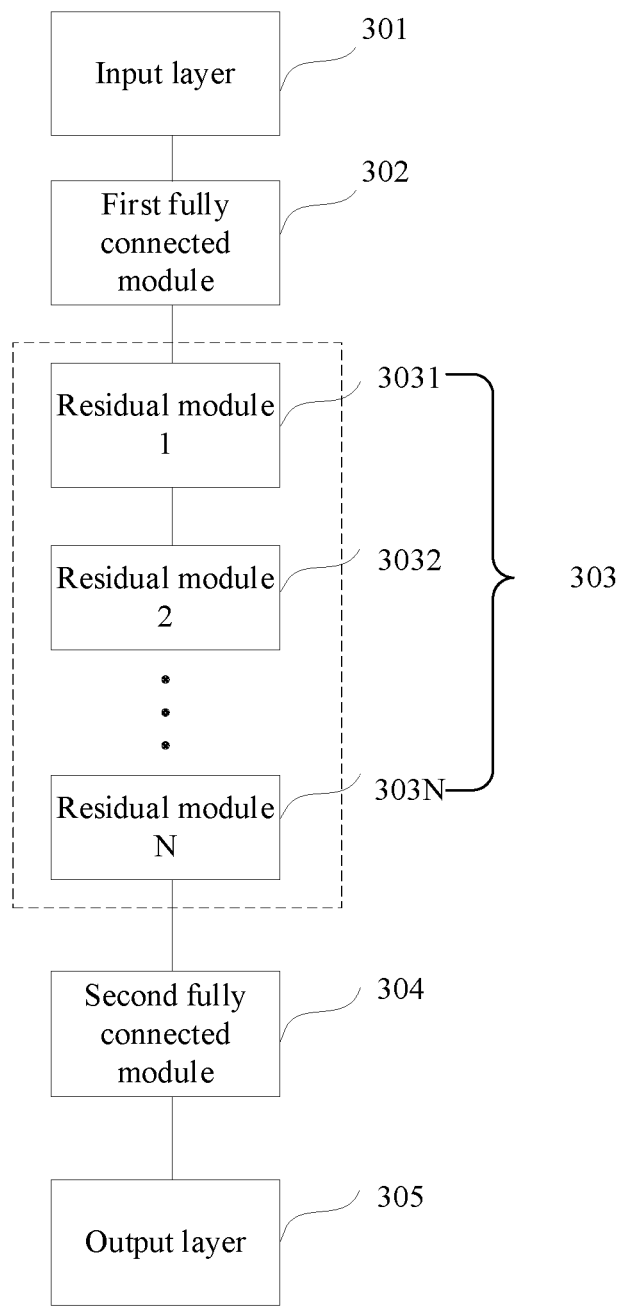
FIG. 3 is a schematic structural diagram of a ResDNN model provided in an embodiment of the present disclosure.
Figure 4:
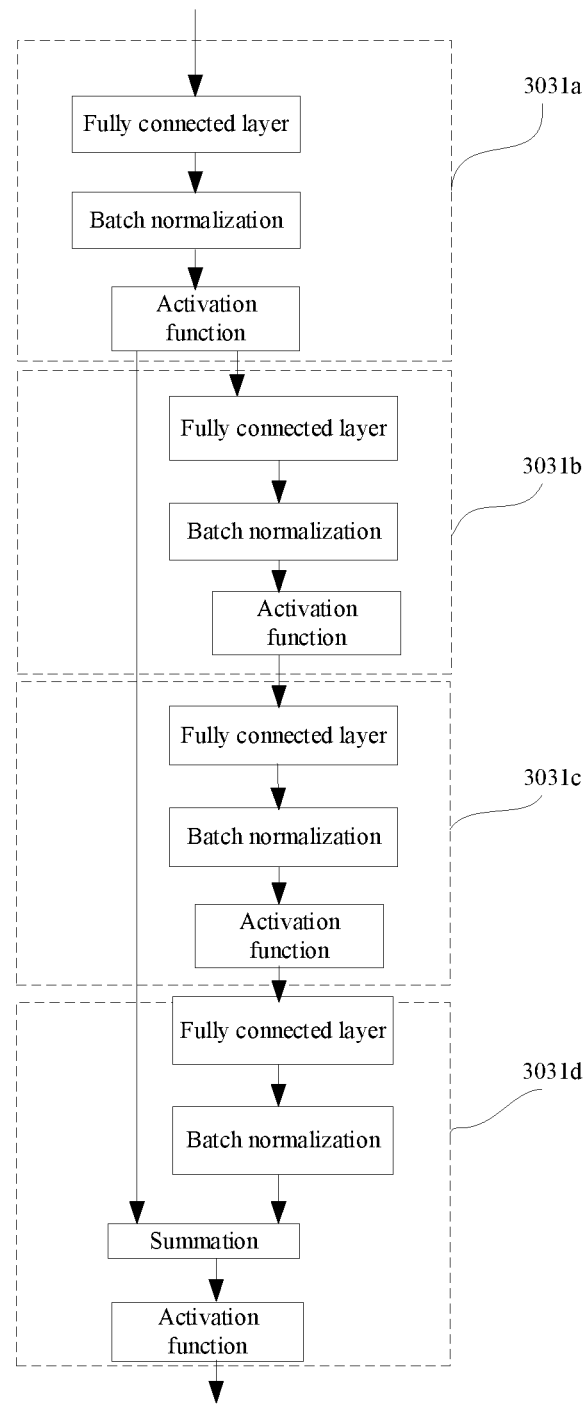
FIG. 4 is a schematic structural diagram of a residual module provided in an embodiment of the present disclosure.

Further, referring to FIG. 3 and FIG. 4, FIG. 3 is a schematic structural diagram of a ResDNN model provided in an embodiment of the present disclosure; and FIG. 4 is a schematic structural diagram of a residual module provided in an embodiment of the present disclosure. As shown in the figure, the ResDNN model may include a residual module 303, the residual module 303 includes a plurality of fully connected units, the plurality of fully connected units is sequentially connected in series, a skip connection exists between the plurality of fully connected units, and the skip connection includes a connection between two non-adjacent fully connected units.

In an alternative embodiment, as shown in FIG. 4, the skip connection is a skip connection between a first fully connected unit 3031a and a last fully connected unit 3031d among the plurality of fully connected units.

Specifically, referring to FIG. 4, each of the fully connected unit includes a fully connected layer, batch normalization (BN), and an activation function. The fully connected layer, the batch normalization, and the activation function are sequentially connected. The fully connected layer may be implemented by general matrix multiplication (GEMM). Each neuron in one of the fully connected layers is connected with all neurons in an upper layer. The number of neurons in the fully connected layers may be set by a user based on the factors, such as desired model fitting ability and model operation efficiency. Specifically, the larger the number of neurons is, the higher the complexity of the model is, and the higher the model fitting ability is. However, the operation time of the model is increased, and the operation efficiency will be decreased. In addition, the number of neurons in the fully connected layers may also be obtained in accordance with a neural architecture search algorithm.

In an alternative embodiment, referring to FIG. 4, the residual module includes four fully connected units sequentially connected in series: a fully connected unit 3031a, a fully connected unit 3031b, a fully connected unit 3031c, and a fully connected unit 3031d. The fully connected unit 3031a is further connected to the fully connected unit 3031d by skipping the fully connected unit 3031b and the fully connected unit 3031c in the middle of the path. Or rather, an output terminal of the activation function of the fully connected unit 3031a is directly connected to an output terminal of the BN of the fully connected unit 3031d, so that output data of the activation function from the fully connected unit 3031a and output data of the BN from the fully connected unit 3031d are added and then inputted into the activation function of the fully connected unit 3031d, thus enabling adaptive skipping of some levels in the neural network model during model training, adaptive adjustment of learning depth, and improvement of the fitting ability of the model. Located between the fully connected layer and an excitation function, the BN is used for batch normalization of the output results of the fully connected layers, to make the mean value thereof approach 0 and the standard deviation thereof approach 1, and guarantee that inputs of the activation function have stable distribution.

The activation function is connected to the BN for increasing the nonlinearity of the neural network model, so that the neural network model can approximate any nonlinear function. In the embodiment of the present disclosure, a Relu function may be used as the activation function.

Further referring to FIG. 3, the ResDNN model includes a first fully connected module 302, a second fully connected module 304, and the residual module 303 between the first fully connected module 302 and the second fully connected module 304; the number of the residual modules 303 is plural; and the plurality of residual modules 303 is cascade-connected and is located between the first fully connected module 302 and the second fully connected module 304.

The first fully connected module 302 may be connected to an input layer 301 of the neural network model. The input layer 301 is used for receiving to-be-processed data (i.e., display parameters, such as a brightness value of a screen and grayscale values of pixel points within a preset display region of the screen). The number of neurons in the input layer 301 is equal to a dimension of the to-be-processed data. The first fully connected module 302 may be used for dimension raising on the to-be-processed data inputted through the input layer 301, to facilitate subsequent processing through the plurality of cascaded residual modules 303. The first fully connected module 302 may include a fully connected layer and an activation function connected to the fully connected layer, where each neuron in the fully connected layer is connected with all neurons in an upper layer.

The second fully connected module 304 may be connected to an output layer 305 of the neural network model. The output layer 305 is used for outputting prediction data (i.e., light leakage values corresponding to pixel points), and the number of neurons in the output layer 305 is equal to a dimension of the prediction data. The second fully connected module 304 is used for dimension reduction of a processing result of a last residual module 303 among the plurality of cascaded residual modules 303, to facilitate output through the output layer 305 of the neural network model. The structure of the second fully connected module 304 is similar to the structure of the first fully connected module 302.

A plurality of residual modules 303 is included between the first fully connected module 302 and the second fully connected module 304, and the plurality of residual modules 303 is sequentially connected in series. The number of residual modules 303 may be set based on the factors, such as desired model fitting ability and model operation efficiency. In a specific implementation of the present disclosure, the number of residual modules 303 is four. It should be understood that in other implementations, the number of residual modules 303 may be more than four or may be less than four. This is not limited in the present embodiment.

In the present embodiment, the same or different number of fully connected units may be included in each residual module 303. In a preferred embodiment, the same number of fully connected units are included in each residual module 303, to facilitate establishing the model. Different number of neurons are included in the fully connected units of each residual module 303. Specifically, based on the sequence of cascade connection of the residual modules 303, the number of neurons included in the fully connected units of the residual modules 303 is decreasing, to facilitate gradual dimension reduction on a processing result of a last residual module 303.

For example, in an implementation of the present disclosure, the neural network model includes four cascaded residual modules 303; each of the residual modules 303 includes four fully connected units; the number of neurons in the four fully connected units of the first residual module is 240, 180, 120, and 240, respectively; the number of neurons in the four fully connected units of the second residual module is 120, 90, 60, and 120, respectively; the number of neurons in the four fully connected units of the third residual module is 60, 45, 30, and 60, respectively, and the number of neurons in the four fully connected units of the fourth residual module is 30, 20, 10, and 30, respectively. The number of neurons of the first fully connected module 302 connected to the first residual module is 120, and the number of neurons of the second fully connected module 304 connected to the fourth residual module is 10.

It should be understood that merely example description is provided here, and in a specific implementation, the number of fully connected units in each residual module 303 and the number of neurons in each fully connected unit may be set based on the factors, such as desired model fitting ability and model operation efficiency. Specifically, the larger the number of fully connected units and/or the number of neurons is, the higher the complexity of the model is, and the higher the fitting ability of the model is. However, the operation time of the model is increased, and the operation efficiency will be decreased.

The plurality of fully connected units included in each residual module is sequentially connected in series, and a skip connection between two non-adjacent fully connected units exists among the plurality of fully connected units. The existence of the skip connection enables adaptive skipping of some levels in the model during training, adaptive adjustment of learning depth, and avoidance of difficult training situations, such as gradient disappearance caused by large depth, so as to deepen the model level, and make the trained model have better fitting ability.

Table 1 shows maximum light leakage errors of channels when an ordinary DNN model and the ResDNN model are used as the neural network model respectively under the same test conditions. As can be seen from Table 1, the maximum light leakage errors are apparently small when the ResDNN model is used, i.e., the ResDNN model has stronger fitting ability, higher light leakage detection accuracy, shorter model training duration, and faster training.

TABLE 1

| Indicator | DNN | ResDNN |
| --- | --- | --- |
| R Low medium brightness (brightness value 0-200) | 3.6 lux | 1.6 lux |
| R High brightness (brightness value 200-255) | 2.5 lux | 1.8 lux |
| G Low medium brightness (brightness value 0-200) | 1.1 lux | 0.8 lux |
| G High brightness (brightness value 200-255) | 1.6 lux | 1.1 lux |
| B Low medium brightness (brightness value 0-200) | 2.4 lux | 1.8 lux |
| B High brightness (brightness value 200-255) | 1.7 lux | 1.4 lux |
| Training duration of single model | 90 min-120 min | 60 min-80 min |

Figure 5:
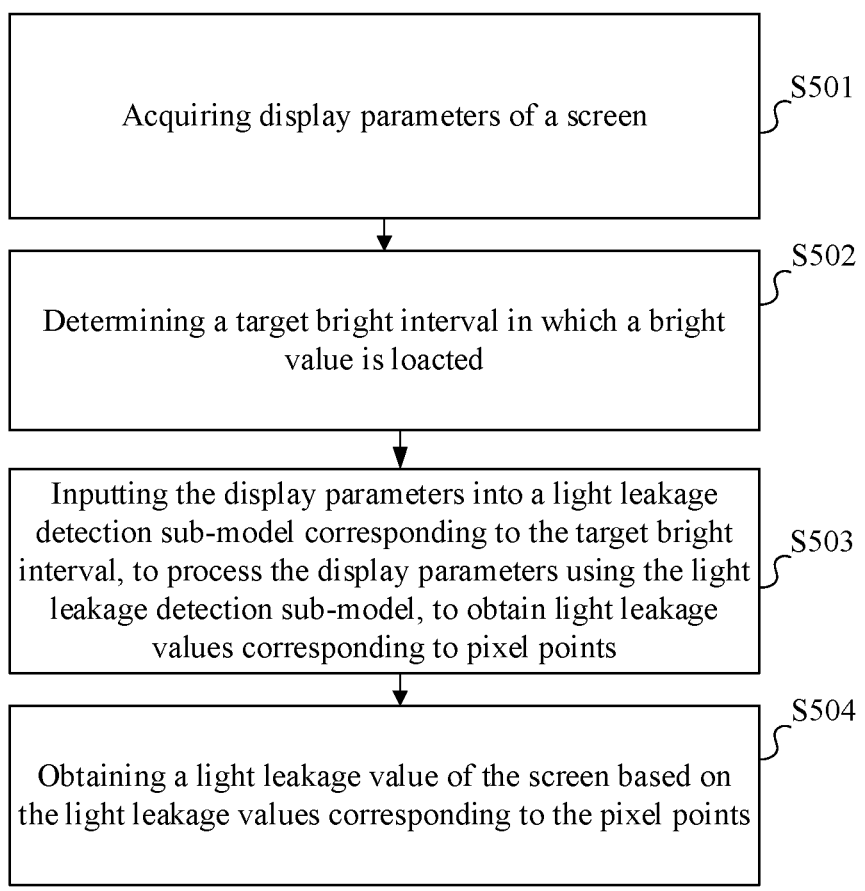
FIG. 5 is a schematic flowchart of another method for detecting light leakage of a screen provided in an embodiment of the present disclosure.

Based on the above embodiments, referring to FIG. 5, FIG. 5 shows a schematic flowchart of another method for detecting light leakage of a screen provided in an embodiment of the present disclosure. The difference between the method and the embodiment shown in FIG. 2 lies in that: in the present embodiment, the neural network model includes a plurality of light leakage detection sub-models, where each of the light leakage detection sub-models corresponds to a target brightness interval. Specifically, a brightness range of the screen may be divided into N target brightness intervals (i.e., N brightness levels) based on the brightness value, where N is an integer, and N≥2. For each brightness level, a light leakage detection sub-model is provided, and the structure of each light leakage detection sub-model is similar to the structure of the neural network model in the above embodiment 3. The description will not be repeated here. For example, in an implementation, the brightness range of the screen is divided into three intervals: a low brightness interval, a medium brightness interval, and a high brightness interval. The low brightness interval is from 0 to 56 lux, the medium brightness interval is from 56 to 200 lux, and the high brightness interval is from 200 to 255 lux. It should be understood that merely example description is provided here, and does not constitute any limitation to the embodiments of the present disclosure.

As shown in FIG. 5, the method for detecting light leakage of a screen includes:

Step S501: acquiring display parameters of a screen.

The display parameters include: a brightness value of the screen and grayscale values of pixel points within a preset display region of the screen.

S502: determining a target brightness interval in which the brightness value is located.

S503: inputting the display parameters into a light leakage detection sub-model corresponding to the target brightness interval, to process the display parameters using the light leakage detection sub-model, to obtain light leakage values corresponding to pixel points.

Step S504: obtaining a light leakage value of the screen based on the light leakage values corresponding to the pixel points.

Specific processes and working principles of S501 and S504 are similar to those of S201 and S203 in the embodiment shown in FIG. 2. The description will not be repeated here. In steps S502 and S503, the electronic device may pre-store a preset mapping characterizing one-to-one correspondence between the target brightness interval and the light leakage detection sub-model. When the brightness value of the screen is acquired, a target brightness interval in which the brightness value is located may be determined based on comparison between the brightness value and the target brightness interval of the screen, and then in step S503, the display parameters are inputted into the light leakage detection sub-model corresponding to the target brightness interval, to process the display parameters using the light leakage detection sub-model, to obtain the light leakage values corresponding to the pixel points.

Because the distribution of display parameters of the screen and light leakage values of the screen in different target brightness intervals is quite different, a light leakage detection sub-model is provided for each target brightness interval. During application, a light leakage detection sub-model matching the brightness value of the screen is selected to process the display parameters of the screen, thereby further improving the accuracy of light leakage detection on the whole.

Figure 6:
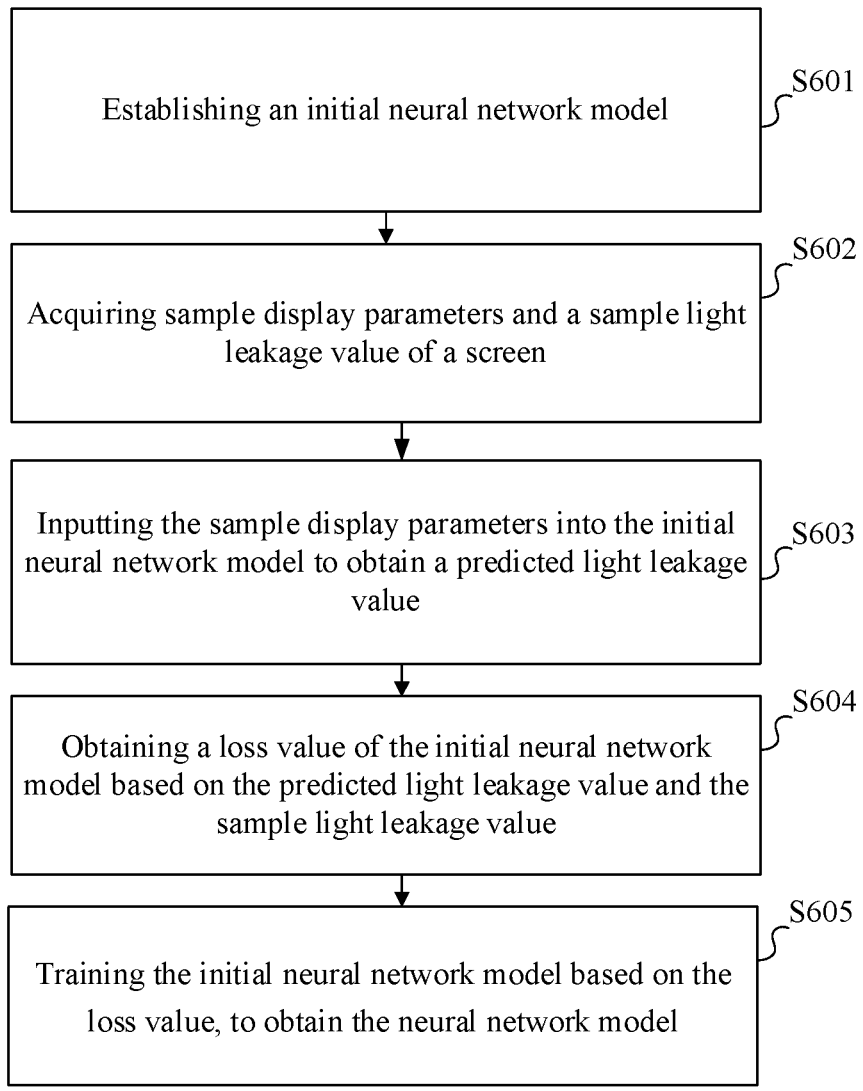
FIG. 6 is a schematic flowchart of a method for training a neural network model provided in an embodiment of the present disclosure.

FIG. 6 is a schematic flowchart of a method for training a neural network model provided in an embodiment of the present disclosure. As shown in FIG. 6, the method includes:

S601: establishing an initial neural network model.

The structure of the initial neural network model is similar to the structure of the pre-trained neural network model in the above embodiments. The description will not be repeated here.

S602: acquiring sample display parameters and a sample light leakage value of a screen.

The meanings of the sample display parameters and the sample light leakage value are similar to the meanings of the display parameters and the light leakage values in the above embodiments. The description will not be repeated here.

In a specific implementation, a screen of the electronic device may be controlled to display different brightness and different gray backgrounds in a constant step size within a dark room that is substantially free from interference of any ambient light, and a sensing value outputted from a light sensor based on a combination of different brightness and different gray backgrounds is recorded. The combination of different brightness and different gray backgrounds may be acquired for use as the sample display parameters. It is understandable that the combination of different brightness and different gray backgrounds as the sample display parameters include the brightness value and the grayscale value of the background. Since the ambient light within the dark room is 0, the sensing value outputted from the light sensor based on the combination of different brightness and different gray backgrounds is the corresponding light leakage value of the screen, i.e., the sample light leakage value. The sample display parameters and the sample light leakage value may be acquired from different electronic devices. Some of the acquired sample display parameters and sample light leakage value may be used for training the initial neural network model, and the rest may be used as a validation set for validating performance of the neural network model.

It should be understood that, in order to weaken the influence of temperature changes, the electronic device may be placed in a thermostat or an air-conditioned room at a constant temperature to guarantee that the acquired sample light leakage value does not fluctuate with temperature. In addition, in order to reduce the impact of noise, the sample light leakage value may be collected many times under the same sample display parameters, and the mean value of the sample light leakage values collected many times is used as the final sample light leakage value.

It should be understood that in other implementations, the sample display parameters further include a sample refresh rate of the screen, a sample display mode, and other sample display parameters associated with light leakage of the screen. The way of acquiring the sample light leakage value is similar to the way when the sample display parameters include the brightness value and the grayscale values. The description will not be repeated here.

S603: inputting the sample display parameters into the initial neural network model to obtain a predicted light leakage value.

S604: obtaining a loss value of the initial neural network model based on the predicted light leakage value and the sample light leakage value.

The neural network model may include a plurality of output channels. Accordingly, the predicted light leakage value includes a plurality of predicted channel light leakage values, one of the predicted channel light leakage values corresponds to one of the output channels; the sample light leakage value includes a plurality of sample channel light leakage values, and one of the sample channel light leakage values corresponds to one of the output channels.

In an implementation, step S604 may include: computing a loss value based on the plurality of predicted channel light leakage values and the plurality of sample channel light leakage values, for use as the loss value of the initial neural network model.

In order to avoid the mutual influence between outputs of the channels, in another implementation, step S604 may include:

obtaining, for each of the output channels, a loss value corresponding to the output channel based on a predicted channel light leakage value and a sample channel light leakage value corresponding to the output channel; and fusing (e.g., performing weighted mean on) the loss values corresponding to the plurality of output channels to obtain the loss value of the initial neural network model.

For example, the neural network model may output light leakage values of five channels RGBCW simultaneously, compute five loss values for the five channels respectively, and perform weighted mean on the five loss values, to obtain the loss value of the initial neural network model.

In the present implementation, the loss value is computed separately for each output channel among the plurality of output channels of the neural network model, thereby reducing the mutual influence between the outputs of the channels, and improving the fitting accuracy of the trained neural network model.

S605: training the initial neural network model based on the loss value, to obtain the neural network model.

Specifically, model parameters of the initial neural network model are adjusted based on the loss value, and this process is iteratively executed until the loss value is less than a desired loss value.

It should be understood that after the training of the neural network model is completed, the performance of the neural network model may be further validated using the validation set. If the performance of the neural network model meets desired performance requirements, the neural network model may be stored in the electronic device. If the performance of the neural network model does not meet the desired performance requirements, the structure and/or parameters of the neural network model may be adjusted, and steps S603 to S605 may be re-executed, until the performance of the neural network model meets the desired performance requirements.

After the training of the neural network model is completed, the neural network model may be stored in the electronic device. In order to save the storage space and improve the computing speed when applying the model, in an implementation, integer quantization is performed on the neural network model, and the quantized neural network model is stored. For example, 8-bit integer quantization is performed on the model parameters of the neural network model, and the quantized neural network model is stored. 8-bit integer quantization (int8 quantization) is performed on the model parameters, thereby reducing the storage space required for storing the neural network model to ¼ of the original storage space. Further, 8-bit integer quantization is performed on the model parameters, thereby greatly improving the computing speed when the electronic device invokes the trained neural network model for light leakage detection, and further reducing the power consumption of the electronic device during the model application.

In the embodiment of the present disclosure, sample display parameters and a sample light leakage value are acquired to train an initial neural network model, such that the trained neural network model learns internal correlation between the sample display parameters and the sample light leakage values, and such that when the neural network model is used for light leakage detection, the light leakage value of the screen can be accurately and reliably determined.

It should be noted that, in the above embodiments, the concept of the present disclosure is described mainly based on the display parameters including, e.g., a brightness value and a grayscale value of the screen. It should be understood that, as mentioned above, the factors that affect the light leakage of the screen further include, e.g., the refresh rate of the screen, the display mode of the screen, and/or other display parameters associated with the light leakage of the screen. The light leakage value is computed based on a plurality of factors, thereby contributing to further improving the accuracy of light leakage detection. The working principle when the display parameters further include the refresh rate of the screen, the display mode of the screen, and/or other display parameters associated with the light leakage of the screen is similar to the working principle in the above embodiments. The description will not be repeated here.

Figure 7:
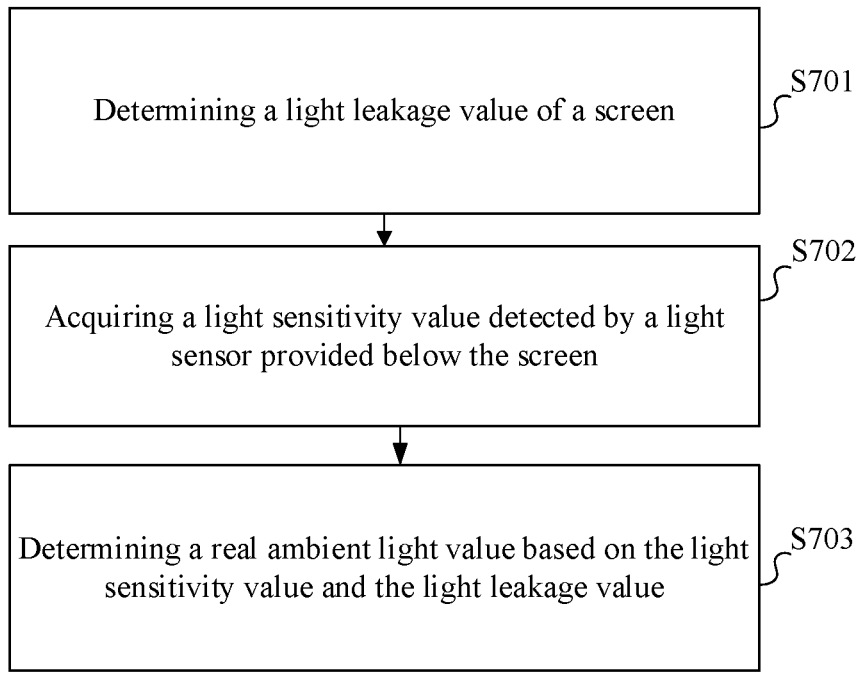
FIG. 7 is a schematic flowchart of a method for detecting ambient light provided in an embodiment of the present disclosure.

Referring to FIG. 7, an embodiment of the present disclosure further provides a method for detecting ambient light. The method is used for determining a real ambient light value based on the light leakage value of the screen detected in the above embodiments. The method for detecting ambient light provided in an embodiment of the present disclosure is specifically illustrated below with reference to FIG. 7. As shown in FIG. 7, the method includes:

Step S701: determining a light leakage value of a screen based on the method for detecting light leakage of a screen according to any one of the above embodiments.

That is, an electronic device may obtain the light leakage value of the screen by detection using the method for detecting light leakage of a screen mentioned in any one of the above embodiments.

Step S702: acquiring a light sensitivity value detected by a light sensor provided below the screen.

Step S703: determining a real ambient light value based on the light sensitivity value and the light leakage value.

Specifically, the electronic device may obtain the real ambient light value based on a difference between the light sensitivity value and the light leakage value. The electronic device may adjust brightness of the screen based on the real ambient light value, such that the brightness of the screen conforms to visual perception of human eyes. In addition, the electronic device may further adjust color temperatures based on the real ambient light value, to assist in display and photographing.

In the embodiment of the present disclosure, because the neural network model has high self-learning and adaptive ability, the trained neural network model learns internal correlation between display parameters, such as grayscale values and brightness values of pixel points in the screen, and light leakage values of the pixel points. Therefore, when the light leakage value of the screen is determined, the display parameters of the screen are acquired, and are inputted into the neural network model, such that the light leakage values of the pixel points in the screen can be accurately and reliably determined, and then, the light leakage value of the screen can be accurately and reliably determined based on the light leakage values of each of the pixel points, thereby improving the accuracy of light leakage detection of the screen. Because the accuracy of light leakage detection of the screen is improved, the current ambient light value can be accurately determined based on the light sensitivity value outputted from the light sensor and the light leakage value obtained based on the neural network model, thereby improving the accuracy of ambient light detection.

Figure 8:
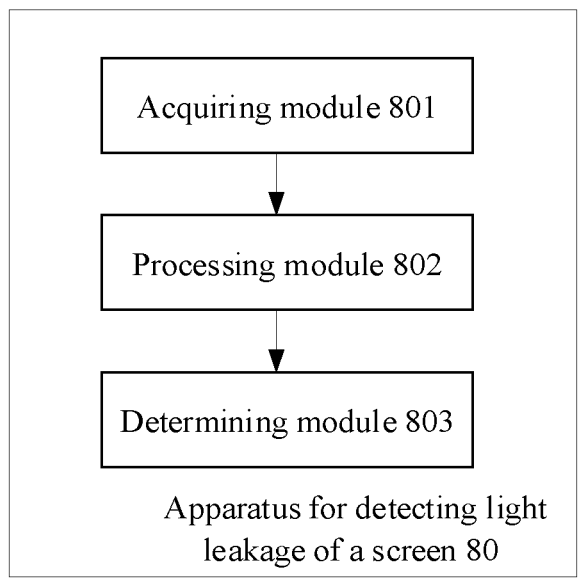
FIG. 8 is a schematic structural diagram of an apparatus for detecting light leakage of a screen provided in an embodiment of the present disclosure.

Referring to FIG. 8, a schematic structural diagram of an apparatus for detecting light leakage of a screen according to an embodiment of the present disclosure is shown. As shown in FIG. 8, the apparatus 80 for detecting light leakage of a screen includes:

an acquiring module 801 configured to acquire display parameters of a screen, the display parameters including: a brightness value of the screen and grayscale values of pixel points within a preset display region of the screen;

a processing module 802 configured to input the display parameters into a pre-trained neural network model, to process the display parameters using the neural network model, to obtain light leakage values corresponding to the pixel points; and a determining module 803 configured to obtain a light leakage value of the screen based on the light leakage values corresponding to the pixel points.

In an implementation of the present disclosure, the neural network model includes a plurality of light leakage detection sub-models, where each of the light leakage detection sub-models corresponds to a target brightness interval; and the processing module 802 is configured to:

determine a target brightness interval in which the brightness value is located; and input the display parameters into a light leakage detection sub-model corresponding to the target brightness interval, to process the display parameters using the light leakage detection sub-model, to obtain the light leakage values corresponding to the respective pixel points.

In an implementation of the present disclosure, the neural network model includes a residual module, the residual module includes a plurality of fully connected units, the plurality of fully connected units is sequentially connected in series, a skip connection exists between the plurality of fully connected units, and the skip connection includes a connection between two non-adjacent fully connected units.

In an implementation of the present disclosure, the skip connection is a skip connection between a first fully connected unit and a last fully connected unit among the plurality of fully connected units.

In an implementation of the present disclosure, the number of the residual modules is plural, the neural network model further includes a first fully connected module and a second fully connected module, and the plurality of residual modules is cascade-connected and is located between the first fully connected module and the second fully connected module.

In an implementation of the present disclosure, each of the fully connected units includes a fully connected layer, batch normalization, and an activation function.

In an implementation of the present disclosure, the apparatus for detecting light leakage of a screen further includes a model training module, which is configured to:

establish an initial neural network model;

acquire sample display parameters and a sample light leakage value of the screen;

input the sample display parameters into the initial neural network model to obtain a predicted light leakage value;

obtain a loss value of the initial neural network model based on the predicted light leakage value and the sample light leakage value; and train the initial neural network model based on the loss value, to obtain the neural network model.

In an implementation of the present disclosure, the neural network model includes a plurality of output channels, the predicted light leakage value includes a plurality of predicted channel light leakage values, one of the predicted channel light leakage values corresponds to one of the output channels, the sample light leakage value includes a plurality of sample channel light leakage values, and one of the sample channel light leakage values corresponds to one of the output channels; and the model training module is configured to:

obtain, for each of the output channels, a loss value corresponding to the output channel based on a predicted channel light leakage value and a sample channel light leakage value corresponding to the output channel; and fuse the loss values corresponding to the plurality of output channels to obtain the loss value of the initial neural network model.

In an implementation of the present disclosure, the apparatus for detecting light leakage of a screen further includes a storage module, which is configured to: perform integer quantization on the neural network model, and store the quantized neural network model.

In an implementation of the present disclosure, the preset display region is a light detection region of the screen, and the light detection region corresponds to a position of a light sensor provided below the screen.

In an implementation of the present disclosure, the determining module 803 is configured to:

acquire light leakage weight values of pixel points, where the light leakage weight value of each pixel point is associated with a relative position between the pixel point and the light sensor provided below the screen; and determine the light leakage value of the screen based on the light leakage values corresponding to the pixel points and the light leakage weight values of the pixel points.

The apparatus 80 for detecting light leakage of a screen provided in the present embodiment is configured to implement the method for detecting light leakage of a screen according to the above embodiments, and has the beneficial effects of the corresponding method embodiments. The description will not be repeated here.

Figure 9:
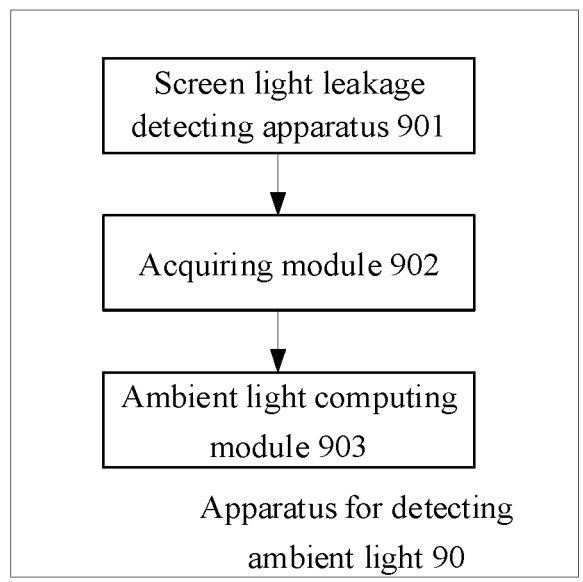
FIG. 9 is a schematic structural diagram of an apparatus for detecting ambient light provided in an embodiment of the present disclosure.

Referring to FIG. 9, a schematic structural diagram of an apparatus for detecting ambient light according to an embodiment of the present disclosure is shown. As shown in FIG. 9, the apparatus 90 for detecting ambient light includes:

a screen light leakage detecting apparatus 901 configured to determine a light leakage value of a screen, where the screen light leakage detecting apparatus 901 is the apparatus 80 for detecting light leakage of a screen according to the third aspect, specifically referring to the apparatus 80 for detecting light leakage of a screen provided in the third aspect of the present disclosure, and having the functions and the beneficial effects of the corresponding apparatus embodiments, and the description will not be repeated here;

an acquiring module 902 configured to acquire a light sensitivity value detected by a light sensor provided below the screen; and an ambient light computing module 903 configured to determine a real ambient light value based on the light sensitivity value and the light leakage value.

The apparatus 90 for detecting ambient light provided in the present embodiment is configured to implement the method for detecting ambient light in the above embodiments, and has the beneficial effects of the corresponding method embodiments. The description will not be repeated here.

Figure 10:
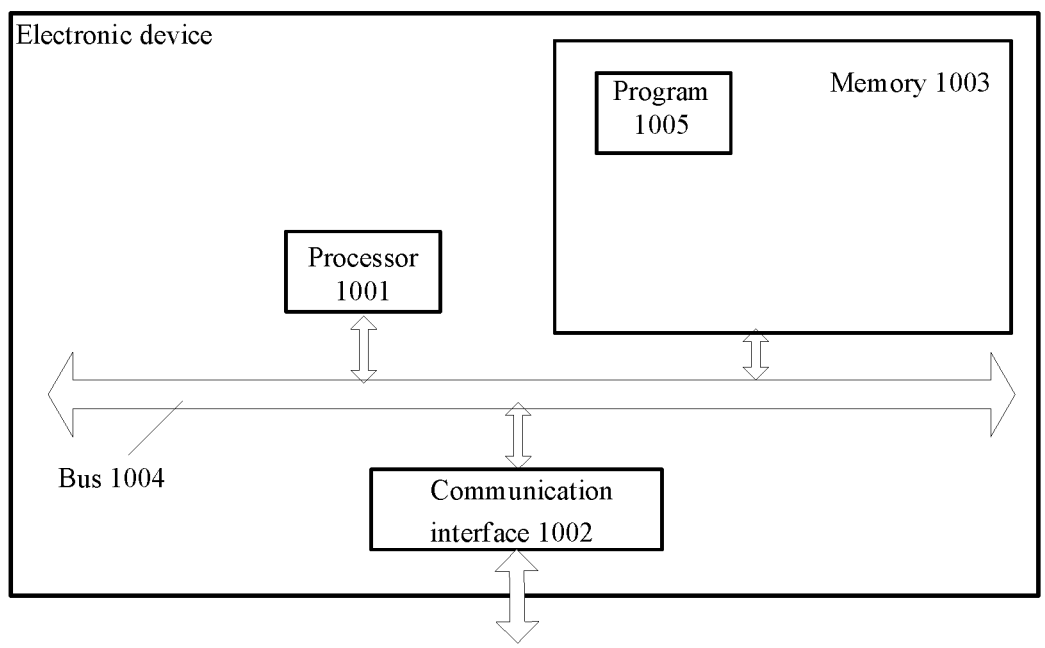
FIG. 10 is a schematic structural diagram of an electronic device provided in an embodiment of the present disclosure.

Referring to FIG. 10, a schematic structural diagram of an electronic device according to an embodiment of the present disclosure is shown. Specific embodiments of the present disclosure do not impose any limitation on specific implementations of the electronic device.

As shown in FIG. 10, the electronic device may include: a processor 1001, a communication interface 1002, a memory 1003, and a communication bus 1004.

The processor 1001, the communication interface 1002, and the memory 1003 complete communication with each other through the communication bus 1004.

The communication interface 1002 is configured to communicate with other electronic devices or servers.

The processor 1001 is configured to execute a program 1005, and specifically may execute relevant steps of the method for detecting light leakage of a screen and/or the method for detecting ambient light according to the above method embodiments.

Specifically, the program 1005 may include a program code. The program code includes computer operation instructions.

The processor may be a central processing unit, or an application specific integrated circuit, or one or more integrated circuits configured to implement the embodiments of the present disclosure. One or more processors included in a smart device may be processors of a given type, e.g., one or more CPUs; or may be processors of different types, e.g., one or more CPUs and one or more ASICs.

The memory is configured to store the program. The memory may include a high-speed RAM memory, and may further include a non-volatile memory, e.g., at least one disk memory. The program may be specifically used for making the processor execute relevant steps of the method for detecting light leakage of a screen and/or the method for detecting ambient light according to the above method embodiments. Corresponding description of the corresponding steps in the above method embodiments may be referred to for specific implementations of each step. The description will not be repeated here.

The electronic device in the present embodiment is configured to implement the corresponding methods in the above method embodiments, and has the beneficial effects of the corresponding method embodiments. The description will not be repeated here. The electronic device may be, for example, a portable or mobile computing device, such as a smart phone, a notebook computer, a tablet computer, or a game device, or may be other electronic devices, such as an electronic database, an automobile, or an automated teller machine (ATM) of a bank. This is not limited in the embodiments of the present disclosure.

The embodiment of the present disclosure provides a computer readable storage medium storing a computer program thereon, where the computer program, when executed by a processor, implements the method for detecting light leakage of a screen provided in the above method embodiments and/or the method for detecting ambient light provided in the above method embodiments. It has similar working principle and technical effects. The description will not be repeated here.

It should be noted that, depending on the implementation requirements, the components/steps described in the embodiments of the present disclosure may be split into more components/steps, or two or more components/steps or partial operations of the components/steps may be combined into novel components/steps to achieve the goal of the embodiments of the present disclosure.

The above method according to the embodiments of the present disclosure may be implemented in hardware or firmware, or be implemented as software or computer code storable in a recording medium (such as a CD ROM, RAM, floppy disk, hard disk, or magnetic disk), or be implemented as computer code that is downloaded from a network, is originally stored in a remote recording medium or a non-transitory machine-readable medium, and will be stored in a local recording medium, such that the method described herein may be processed by such software stored on a recording medium using a general-purpose computer, a special-purpose processor, or programmable or dedicated hardware (such as an ASIC or FPGA). It is understandable that a computer, a processor, a microprocessor controller, or programmable hardware includes a storage component (e.g., RAM, ROM, or flash memory) that can store or receive software or computer code. The method for generating a check code described herein is implemented when the software or computer code is accessed and executed by the computer, the processor, or the hardware. Further, when a general-purpose computer accesses the code for implementing the method for generating a check code shown herein, the execution of the code converts the general-purpose computer into a special-purpose computer configured to execute the method for generating a check code shown herein.

As will be appreciated by those of ordinary skills in the art, the various example units and method steps described in combination with the embodiments disclosed herein can be implemented by electronic hardware, or a combination of computer software and electronic hardware. Whether these functions are executed by hardware or software depends on specific applications and design constraints of the technical solutions. Those skilled in the art may implement described functions for each specific application using different methods, but such implementation should not be considered as falling beyond the scope of the embodiments of the present disclosure.

The above embodiments are only used to illustrate the embodiments of the present disclosure, and are not intended to limit the embodiments of the present disclosure. Those of ordinary skills in the relevant technical field may further make various alterations and modifications without departing from the spirit and scope of the embodiments of the present disclosure. Therefore, all equivalent technical solutions are also encompassed within the scope of the embodiments of the present disclosure, and the scope of patent protection of the embodiments of the present disclosure should be defined by the appended claims.

What is claimed is:

1. A method for detecting light leakage of a screen, applied to an electronic device, comprising:
acquiring display parameters of a screen, the display parameters comprising: a brightness value of the screen and grayscale values of respective pixel points within a preset display region of the screen; wherein acquiring the display parameters of the screen comprises: reading the brightness value of the screen from an operating system of the electronic device by using a system interface; and capturing a display content within the preset display region on the screen by using a screenshot software to obtain the grayscale values of the respective pixel points within the preset display region;
inputting the display parameters into a pre-trained neural network model, to process the display parameters using the neural network model, to obtain light leakage values corresponding to the respective pixel points; wherein the pre-trained neural network model represents an internal correlation between the brightness value of the screen and the grayscale value of the respective pixel points and the light leakage values of the pixel points; and obtaining a light leakage value of the screen based on the light leakage values corresponding to the respective pixel points, for correcting an ambient light value detected by a light sensor provided below the screen.

2. The detection method according to claim 1, wherein the neural network model comprises a plurality of light leakage detection sub-models, wherein each of the light leakage detection sub-models corresponds to a target brightness interval; and the inputting the display parameters into the pre-trained neural network model, to process the display parameters using the neural network model, to obtain the light leakage values corresponding to the respective pixel points, comprises:

determining a target brightness interval in which the brightness value is located; and inputting the display parameters into a light leakage detection sub-model corresponding to the target brightness interval, to process the display parameters using the light leakage detection sub-model, to obtain the light leakage values corresponding to the respective pixel points.

3. The detection method according to claim 1, wherein the neural network model comprises a residual module, the residual module comprises a plurality of fully connected units, the plurality of fully connected units is sequentially connected in series, a skip connection exists between the plurality of fully connected units, and the skip connection comprises a connection between two non-adjacent fully connected units.

4. The detection method according to claim 3, wherein the skip connection is a skip connection between a first fully connected unit and a last fully connected unit among the plurality of fully connected units.

5. The detection method according to claim 3, wherein a number of the residual module is plural, the neural network model further comprises a first fully connected module and a second fully connected module, and the plurality of residual modules is cascade-connected and is located between the first fully connected module and the second fully connected module.

6. The detection method according to claim 3, wherein each of the fully connected units comprises a fully connected layer, batch normalization, and an activation function.

7. The detection method according to claim 1, wherein a training process of the neural network model comprises:
establishing an initial neural network model;
acquiring sample display parameters and a sample light leakage value of the screen;
inputting the sample display parameters into the initial neural network model to obtain a predicted light leakage value;
obtaining a loss value of the initial neural network model based on the predicted light leakage value and the sample light leakage value; and
training the initial neural network model based on the loss value, to obtain the neural network model.

8. The detection method according to claim 7, wherein the neural network model comprises a plurality of output channels, the predicted light leakage value comprises a plurality of predicted channel light leakage values, one of the predicted channel light leakage values corresponds to one of the output channels, the sample light leakage value comprises a plurality of sample channel light leakage values, and one of the sample channel light leakage values corresponds to one of the output channels; and the obtaining the loss value of the initial neural network model based on the predicted light leakage value and the sample light leakage value comprises:

obtaining, for each of the output channels, a loss value corresponding to the output channel based on a predicted channel light leakage value and a sample channel light leakage value corresponding to the output channel; and fusing the loss values corresponding to the plurality of output channels to obtain the loss value of the initial neural network model.

9. The detection method according to claim 8, wherein the detection method further comprises: performing integer quantization on the neural network model, and storing the quantized neural network model.

10. The detection method according to claim 1, wherein the preset display region is a light detection region of the screen, and the light detection region corresponds to a position of a light sensor provided below the screen.

11. The detection method according to claim 1, wherein the obtaining the light leakage value of the screen based on the light leakage values corresponding to the respective pixel points comprises:

acquiring light leakage weight values of the respective pixel points, wherein the light leakage weight value of each of the respective pixel points is associated with a relative position between the pixel point and the light sensor provided below the screen; and determining the light leakage value of the screen based on the light leakage values corresponding to the respective pixel points and the light leakage weight values of the respective pixel points.

12. A method for detecting ambient light, comprising:
determining a light leakage value of a screen based on the method for detecting light leakage of a screen according to claim 1;
acquiring a light sensitivity value detected by a light sensor provided below the screen; and
determining a real ambient light value based on the light sensitivity value and the light leakage value.

13. An apparatus for detecting ambient light, comprising: a processor and a memory storing a computer program thereon, wherein the computer program, when executed by a processor, implements operations of:

acquiring display parameters of a screen, the display parameters comprising: a brightness value of the screen and grayscale values of respective pixel points within a preset display region of the screen; wherein acquiring the display parameters of the screen comprises: reading the brightness value of the screen from an operating system of the electronic device by using a system interface; and capturing a display content within the preset display region on the screen by using a screenshot software to obtain the grayscale values of the respective pixel points within the preset display region;

inputting the display parameters into a pre-trained neural network model, to process the display parameters using the neural network model, to obtain light leakage values corresponding to the respective pixel points; wherein the pre-trained neural network model represents an internal correlation between the brightness value of the screen and the grayscale value of the respective pixel points and the light leakage values of the pixel points; and obtaining a light leakage value of the screen based on the light leakage values corresponding to the respective pixel points, for correcting an ambient light value detected by a light sensor provided below the screen;

acquiring a light sensitivity value detected by a light sensor provided below the screen; and determining a real ambient light value based on the light sensitivity value and the light leakage value.

* * * * *